(12) United States Patent
Ueno et al.

(10) Patent No.: US 9,731,750 B2
(45) Date of Patent: Aug. 15, 2017

(54) RACK-AND-PINION STEERING GEAR UNIT

(71) Applicant: NSK LTD., Tokyo (JP)

(72) Inventors: Seiji Ueno, Maebashi (JP); Osamu Wada, Maebashi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 14/779,749

(22) PCT Filed: Jun. 11, 2014

(86) PCT No.: PCT/JP2014/065516
§ 371 (c)(1),
(2) Date: Sep. 24, 2015

(87) PCT Pub. No.: WO2014/200040
PCT Pub. Date: Dec. 18, 2014

(65) Prior Publication Data
US 2016/0052539 A1    Feb. 25, 2016

(30) Foreign Application Priority Data

Jun. 12, 2013   (JP) ................................. 2013-123433
Jun. 13, 2013   (JP) ................................. 2013-124930

(51) Int. Cl.
*B62D 3/12*   (2006.01)
*B62D 7/16*   (2006.01)

(52) U.S. Cl.
CPC ............. *B62D 3/126* (2013.01); *B62D 7/163* (2013.01)

(58) Field of Classification Search
CPC ................................. B62D 3/126; B62D 7/163
See application file for complete search history.

(56) References Cited

U.S. PATENT DOCUMENTS

| | | | | |
|---|---|---|---|---|
| 6,843,343 | B2 * | 1/2005 | Shimizu | B62D 3/126 |
| | | | | 180/444 |
| 7,458,290 | B2 * | 12/2008 | Jang | B62D 3/12 |
| | | | | 74/388 PS |
| 8,690,173 | B2 * | 4/2014 | Bilmayer | B62D 3/126 |
| | | | | 280/93.514 |
| 2002/0020237 | A1 | 2/2002 | Tsubouchi et al. | |
| 2003/0209100 | A1 | 11/2003 | Tsubouchi et al. | |
| 2004/0177501 | A1 | 9/2004 | Saarinen | |

(Continued)

FOREIGN PATENT DOCUMENTS

| | | |
|---|---|---|
| DE | 743 633 C | 12/1943 |
| EP | 1 177 966 A2 | 2/2002 |

(Continued)

OTHER PUBLICATIONS

Office Action dated Jun. 15, 2015 issued by the Japanese Patent Office in Application No. 2014-211157.

(Continued)

*Primary Examiner* — Faye M Fleming
(74) *Attorney, Agent, or Firm* — Sughrue Mion, PLLC

(57) ABSTRACT

A rack-and-pinion steering gear unit includes a rack shaft and a cylindrical portion. The rack shaft is configured as a hollow pipe as a whole by bending an elongated metal plate such that widthwise end edges of the metal plate are butted to each other. A cylindrical portion is fitted on an end portion of the rack shaft.

9 Claims, 12 Drawing Sheets

(56) References Cited

U.S. PATENT DOCUMENTS

| | | | | |
|---|---|---|---|---|
| 2005/0139026 A1* | 6/2005 | Yamazaki | ............... | B21K 1/767 |
| | | | | 74/388 PS |
| 2005/0167182 A1* | 8/2005 | Abe | ........................ | B62D 3/12 |
| | | | | 180/444 |
| 2008/0229856 A1 | 9/2008 | Yamawaki et al. | | |
| 2009/0250288 A1* | 10/2009 | Watanabe | ................ | B62D 3/12 |
| | | | | 180/444 |
| 2010/0221061 A1 | 9/2010 | Hahn et al. | | |
| 2012/0102739 A1 | 5/2012 | Yamawaki et al. | | |
| 2012/0103120 A1 | 5/2012 | Yamawaki et al. | | |

FOREIGN PATENT DOCUMENTS

| | | |
|---|---|---|
| EP | 1 972 395 A2 | 9/2008 |
| JP | 57-163714 A | 10/1982 |
| JP | 2-61771 U | 5/1990 |
| JP | 6-69061 U | 9/1994 |
| JP | 11-278287 A | 10/1999 |
| JP | 2001-219854 A | 8/2001 |
| JP | 2002-1432 A | 1/2002 |
| JP | 2002-48220 A | 2/2002 |
| JP | 2004-44720 A | 2/2004 |
| JP | 2006-160113 A | 6/2006 |
| JP | 2009-536121 A | 10/2009 |
| JP | 2013-224106 A | 10/2013 |
| WO | 03/091083 A1 | 11/2003 |
| WO | 2011/077614 A1 | 6/2011 |

OTHER PUBLICATIONS

Int. Search Report dated Jul. 8, 2014 issued by the Int. Searching Authority in counterpart Application No. PCT/JP2014/065516 (PCT/ISA/210).

Written Opinion dated Jul. 8, 2014 issued by the Int. Searching Authority in counterpart Application No. PCT/JP2014/065516 (PCT/ISA/237).

Communication dated May 25, 2016 issued by European Patent Office in counterpart European Application No. 14810343.5.

* cited by examiner

RACK-AND-PINION STEERING GEAR UNIT

TECHNICAL FIELD

The present invention relates to a rack-and-pinion steering gear unit of a steering apparatus for giving a steering angle to wheels to be steered in accordance with an operation of a steering wheel.

BACKGROUND ART

As a steering apparatus of an automobile, conventionally, a steering apparatus having a rack-and-pinion steering gear unit has been widely used. FIGS. 11 to 13 illustrate an example of a conventional structure of such a steering apparatus. This steering apparatus, the overall configuration of which is shown in FIG. 11, has a configuration capable of giving a desired steering angle to the left and right wheels to be steered (the front wheels) by converting the rotational motion of a steering wheel 1 operated by the driver into a linear motion using a rack-and-pinion steering gear unit 5. More specifically, the steering wheel 1 is fixed to the rear end portion of a steering shaft 2 in order to realize this configuration. In addition, the front end portion of this steering shaft 2 is connected to the base end portion of the pinion shaft 6 of the steering gear unit 5 via a pair of universal joints 3, 3 and an intermediate shaft 4. Furthermore, the base end portions of a pair of tie rods 8, 8 respectively connected to the left and right wheels to be steered are connected to the axial end portions of the rack shaft 7 that is engaged with the pinion shaft 6.

The steering gear unit 5 includes a gear housing 9, the pinion shaft 6, the rack shaft 7, and a pressing means 10 as shown in detail in FIGS. 12 and 13. The gear housing 9, fixed to the vehicle body, is integrally equipped with a first housing 11 for housing the axially intermediate portion of the rack shaft 7, a second housing 12 for housing the tip half section of the pinion shaft 6, and a third housing 13 for housing the pressing means 10. The pinion shaft 6 has pinion teeth 14 at the portion near the distal end of the outer peripheral surface thereof. The pinion shaft 6 having this configuration is supported by a pair of rolling bearings 15, 16 so as to be only rotatable with respect to this second housing 12 while the tip half section thereof is in a state of being inserted into the inside of the second housing 12.

The rack shaft 7 has rack teeth 17 at a portion near one axial end thereof on the front face. The outer peripheral surface of the rack shaft 7 is a cylindrical face except for the portion in which the rack teeth 17 are formed. In other words, the cross-sectional shape of the outer peripheral surface of the rack shaft 7 is circular at the portions away from the rack teeth 17 in the axial direction, and at the portion in the axial direction in which the rack teeth 17 are formed, the portion corresponding to the rack teeth 17 is linear and the rest is arc-like. The rack shaft 7 having this configuration is supported in the first housing 11 so as to be displaceable in the axial direction via a pair of rack bushings 18, 18 in a state in which the axially intermediate portion is inserted into the inside of the first housing 11 and the rack teeth 17 are engaged with the pinion teeth 14.

The pressing means 10 is housed inside the third housing 13, and has a pressing member 19 and a spring 20. Furthermore, the pressing face of the pressing member 19, that is, the distal end face thereof, is made constant with the portion of the rear face of the rack shaft 7 on the opposite side of the pinion shaft 6 across the rack shaft 7 so that the rack shaft 7 can slide in the axial direction. With this state, the pressing member 19 is elastically pressed against the rear face of the rack shaft 7 using the spring 20. Hence, a preload is given to the engagement portion between the pinion teeth 14 and the rack teeth 17, whereby noise is suppressed from being generated from this engagement portion and the operation feeling of the steering apparatus is improved. The pressing member 19 is wholly made of such a low friction material as described above or has a low friction material layer on the pressing face making slide contact with the rear face of the rack shaft 7.

The front end portion of the intermediate shaft 4 is connected to the base end portion of the pinion shaft 6 via the universal joint 3. The base end portions of the tie rods 8, 8 are connected to the axial end portions of the rack shaft 7 via spherical joints (ball joints) 21, 21. Each of the spherical joints 21, 21 has a spherical body 29 and a cup-shaped joint housing 30 rotatably holding the spherical body 29 inside. Furthermore, the spherical bodies 29 are fixed (integrated or connected and fixed) to the base end portions of the tie rods 8, 8, and the joint housings 30 are securely connected to the end portions of the rack shaft 7 with screws or the like.

According to the steering apparatus configured as described above, when the driver operates the steering wheel 1, the rotation of the steering wheel 1 is transmitted to the pinion shaft 6 via the universal joints 3, 3 and the intermediate shaft 4. As a result, the rack shaft 7 is displaced in the axial direction, whereby the tie rods 8, 8 are pushed and pulled, and the desired steering angle is given to the left and right wheels to be steered.

It has been widely known that producing the rack shaft of the rack-and-pinion steering gear unit to be incorporated into the above-mentioned steering apparatus by bending a metal plate, such as a steel plate, can suppress the production cost of the rack shaft and can reduce the weight thereof according to the descriptions in Patent Documents 1 to 4. FIG. 14 illustrates a method for producing the rack shaft described in Patent Document 3 in the order of the process. First, a long and substantially rectangular (band shaped) blank plate 22 shown in (A) of FIG. 14 is provided by, for example, punching a metal plate having sufficient rigidity, such as a steel plate, by press working. This blank plate 22 is provided, at a portion in the longitudinal direction (in the axial direction of a completed rack shaft 7a and the left-right direction in (A)(a) of FIG. 14), with a narrow portion 23, the dimension of which in the width direction (in the up-down direction in (A)(a) of FIG. 14) is smaller than the dimensions of the other portions.

The blank plate 22 configured as described above is, for example, placed on the upper face of a die and pressed by punching, whereby the widthwise intermediate section thereof is bent and plastically deformed into the shape shown in (B) of FIG. 14 and a first intermediate material 24 is obtained. The cross-sectional shape of a portion (a portion provided with the narrow portion 23) in the longitudinal direction of this first intermediate material 24 is set to a flat U-shape, and the cross-sectional shape of the portion thereof away from the portion provided with the narrow portion 23 in the longitudinal direction is set to a U-shape. Hence, widthwise end edges of the first intermediate material 24 can be made parallel to each other in the longitudinal direction. Next, as shown in (C) of FIG. 14, on the front face (the upper face shown in (C)(a) of FIG. 14) of the portion (the portion whose cross-sectional shape is set to the flat U-shape) in the longitudinal direction of the first intermediate material 24 configured as described above, the rack teeth 17 are formed by press working, whereby a second intermediate material 25 is obtained. Then, the widthwise (circumferential) end edges of the second intermediate material 25 configured as described above are butted to each other (made to contact each other or adjacently opposed to each other) by bending as shown in (D) of FIG. 14, whereby a third intermediate material 26 having a substantially circular pipe shape is obtained. In addition, the widthwise end edges of this third intermediate material 26 are connected to each other by a welded section 27 as shown in (E) of FIG. 14, whereby a fourth intermediate material 28 is obtained. Furthermore, as shown in (F) of FIG. 14, the axially intermediate portion and the end portions of this fourth intermediate material 28 are drawn, and screw holes for screw fixing the male screw portions provided at the base portions of the joint housings 30, 30 (see FIG. 12) of the spherical joints 21, 21 are formed on the inner peripheral surfaces of the axial end portions, whereby a rack shaft 7a having a substantially cylindrical pipe shape is obtained.

With the steering gear unit incorporating the rack shaft 7a configured as described above, the male screw portion provided at the base portion of the joint housing 30 is screwed into the screw hole (the female screw portion) provided on the inner peripheral surface of the end portion of the rack shaft 7a and is further tightened to securely connect the joint housing 30 of the spherical joint 21 to the end portion of the rack shaft 7a. In this case, the force is applied to this screw engagement area in a direction in which the diameter of the end portion of the rack shaft 7a expands. As a result, a tension stress in the circumferential direction is generated at the end portion of the rack shaft 7a. There is a possibility that this tension stress may concentrate at the welded section 27 in which the circumferential end edges of the rack shaft 7a are joined to each other. Hence, in order that the joint state by the welded section 27 can be maintained properly even in this case and that sufficient connection strength can be secured at the connection between the end portion of the rack shaft 7a and the joint housing 30, it is necessary to strictly control the strength of the welded section 27. Consequently, the production cost increases by the amount of the control required.

Furthermore, at the connection between the rack shaft 7a and the spherical joint 21 (screw engagement between the screw hole of the rack shaft 7a and the male screw portion of the spherical joint 21), a large bending load (impact load) is applied in some cases, for example, due to the running of a wheel to be steered over a curbstone. Furthermore, due to this impact load, there is a possibility that the axial end portion of the rack shaft 7a provided with the screw hole may be deformed in the direction that the inner diameter thereof is expanded, stress concentration may occur at the welded section 27 in which the widthwise end edges thereof are securely connected to each other, and the connection strength between the rack shaft 7a and the spherical joint 21 may become lower.

PRIOR ART DOCUMENTS

Patent Documents

Patent Document 1: JP11-278287A
Patent Document 2: JP2001-219854A
Patent Document 3: JP2002-1432A
Patent Document 4: JP2004-44720A

SUMMARY OF INVENTION

It is an object of the present invention to provide a structure that sufficiently ensures connection strength at a connection between an end portion of a rack shaft and a spherical joint, the rack shaft being configured as a hollow pipe by butting widthwise end edges of an elongated metal plate to each other.

Means for Solving the Problem

According to an aspect of the present invention, a rack-and-pinion steering gear unit includes a gear housing, a pinion shaft, a rack shaft, and a cylindrical portion. The pinion shaft has pinion teeth on an outer peripheral surface of an axially intermediate portion of the pinion shaft, and is rotatably supported inside the gear housing. The rack shaft is configured as a hollow pipe as a whole by bending an elongated metal plate such that widthwise end edges of the metal plate are butted to each other (contacting each other or adjacently opposed to each other), and by further connecting (joining) the widthwise end edges by a welded section as necessary. The rack shaft has rack teeth on a front face of the rack shaft partially in an axial direction, the rack shaft being disposed in a skewed manner with respect to the pinion shaft and supported inside the gear housing so as to be displaceable in the axial direction in a state in which the rack teeth are engaged with the pinion teeth. The cylindrical portion is fitted on each end portion of the rack shaft.

The rack-and-pinion steering gear unit may include a pair of spherical joints to connect the respective end portions of the rack shaft to a pair of tie rods. The pair of tie rods has distal end portions to which left and right wheels to be steered are connected and base end portions to which the pair of spherical joints is connected. In this case, each of spherical joints has a joint housing connected to the end portion of the rack shaft. An outer peripheral surface of the end portion of the rack shaft has a male screw portion. The joint housing has a base portion configured as the cylindrical portion, and an inner peripheral surface of the cylindrical portion has a female screw portion. The joint housing is connected to the end portion of the rack shaft in a state in which the female screw portion is screwed onto the male screw portion.

The rack-and-pinion steering gear unit may further include a reinforcing member fitted in and held by the end portion of the rack shaft.

The end portion of the rack shaft may further include a small-diameter protruding portion protruding from the male screw portion in the axial direction. An outer diameter of the small-diameter protruding portion is smaller than an inner diameter of the female screw portion. The joint housing may have, at an axially recessed portion in a radially inner side of the cylindrical portion, a receiving portion on which a distal end of the small-diameter protruding portion is allowed to abut. In this case, the joint housing is connected to the end portion of the rack shaft in a state in which the distal end of the small-diameter protruding portion abuts on the receiving portion.

The end portion of the rack shaft may have an inner peripheral surface forming a support hole in which a spherical joint is securely supported, the spherical joint supporting a base end portion of a tie rod connected to a wheel to be steered in a turnable manner. In this case, the cylindrical portion is configured as a sleeve made of a metal (for example, carbon steel such as S45C, or stainless steel) and is press-fitted on an outer peripheral surface of the end portion of the rack shaft.

The spherical joint may have a base portion on which the male screw portion is provided, and the support hole may be configured as a screw hole in which the male screw portion is screwed. In this case, the axially outer face of the sleeve and the axial end face of the rack shaft may be arranged to be flush with each other. Here, the axially outer side refers to a side near the outer side of the vehicle body in the width direction in a state of being assembled in the automobile. On the other hand, the side near the center in the width direction is referred to as axially inner side. The end portion of the rack shaft may be configured as a small-diameter portion having a smaller outer diameter than that of a portion closer to an axially intermediate portion of the rack shaft. In this case, the rack shaft has a step portion connecting the portion closer to the axially intermediate portion and the small-diameter portion to each other. The sleeve is held between the step portion and a seat surface of the spherical joint in the axial direction.

The rack-and-pinion steering gear unit may further include an elastic member (for example, elastomer like rubber) provided on at least an outer peripheral edge portion of the axially inner surface of the sleeve and along the entire circumference of the outer peripheral edge portion. The outer peripheral surface of the end portion of the rack shaft may be configured as a partially conical convex face that is inclined in a direction in which the outer diameter is reduced toward the distal end of the end portion, and the inner peripheral surface of the sleeve may be configured as a partially conical concave face matched with the partially conical convex face.

Advantages of the Invention

With the above-mentioned rack-and-pinion steering gear unit, at the end portion of the rack shaft and the joint housing of the spherical joint being connected to each other, the outer peripheral surface of the end portion of the rack shaft is provided with the male screw portion, and the inner peripheral surface of the cylindrical portion provided at the base portion of the joint housing is provided with the female screw portion. Hence, when the female screw portion is screwed onto the male screw portion and further tightened to connect the end portion of the rack shaft to the joint housing, the force is exerted to this screw engagement area in a direction in which the diameter of the end portion of the rack shaft is reduced. As a result, a compression stress in the circumferential direction, instead of a tensile stress in the circumferential direction, is generated at the end portion of the rack shaft. In other words, according to the present invention, even if the female screw portion is screwed onto the male screw portion and further tightened, no force is exerted in the direction in which the distance between the circumferential end edges of the rack shaft expands. For this reason, it is not necessary to strictly perform strength control for the force for tightening the female screw portion at the end portion (including the welded section in a case in which the circumferential end edges of the rack shaft are connected to each other by the welded section) of the rack shaft. Consequently, the connection strength at the connection between the end portion of the rack shaft and the joint housing can be sufficiently ensured at low cost.

In the case of the present invention, in a state in which the joint housing is connected to the end portion of the rack shaft, the cylindrical portion of the joint housing is fitted on the end portion of the rack shaft. Hence, the strength and rigidity of the connection between the end portion of the rack shaft and the joint housing is easily ensured. Therefore, for example, even when large bending load (impact load) is applied to the connection between the end portion of the rack shaft and the joint housing due to the running of a wheel to be steered over a curbstone for example, plastic deformation or the like at the connection is less likely to occur.

With the reinforcing member fitted in and held at the end portion of the rack shaft, the strength and rigidity of the end portion can be improved. Consequently, for example, when large bending load as described above is applied to the connection between the end portion and the joint housing, plastic deformation or the like at the connection is even less likely to occur. In the case that the small-diameter protruding portion is provided, in a state in which the joint housing is connected to the end portion of the rack shaft, the small-diameter protruding portion is in a state of being elastically compressed in the axial direction. Hence, the screw engagement between the female screw portion and the male screw portion is preloaded in the axial direction based on the elasticity of the small-diameter protruding portion, whereby the screw engagement can be prevented from being loosened.

With the rack-and-pinion steering gear unit described above, regardless of the impact load applied to the connection between the rack shaft and the spherical joint, the connection strength of the rack shaft and the spherical joint can be ensured. That is, when the metal cylindrical sleeve is press-fitted into the axial end portions of the rack shaft, the rigidity of the axial end portions of the rack shaft in the radial direction can be raised. Hence, even when large load (impact load) is applied to the connection between the rack shaft and the spherical joint due to the running of a steered wheel over a curbstone for example, the axial end portion of the rack shaft can be prevented from being deformed in a direction in which the inner diameter expands, and stress can be prevented from being concentrated at the welded section at which the widthwise end edges of the rack shaft are joined to each other, whereby the connection strength of the rack shaft and the spherical joint is ensured.

EMBODIMENTS OF INVENTION

Figure 1:
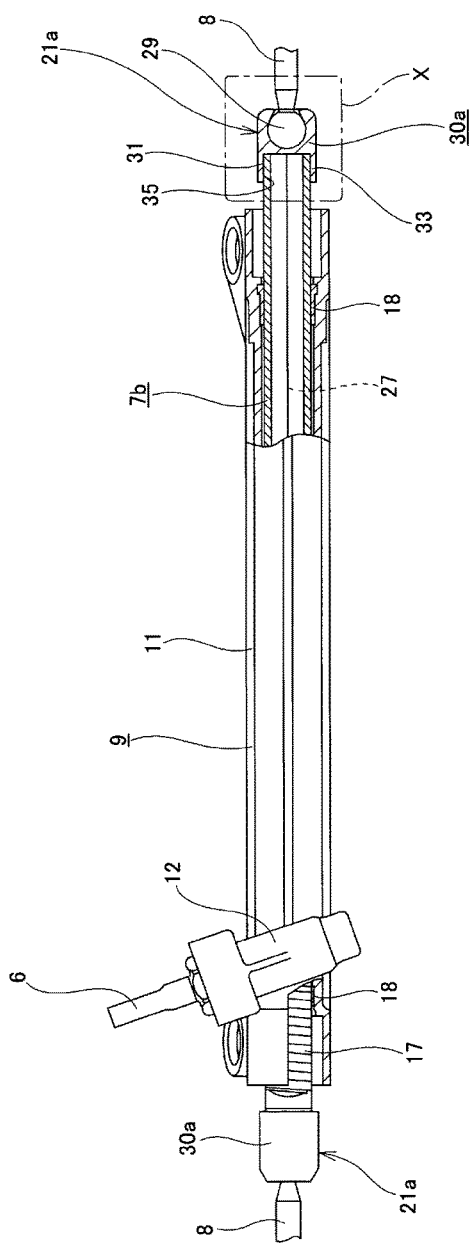
FIG. 1 is a partially cut-away side view of a rack-and-pinion steering gear unit according to a first embodiment of the present invention.
Figure 2:
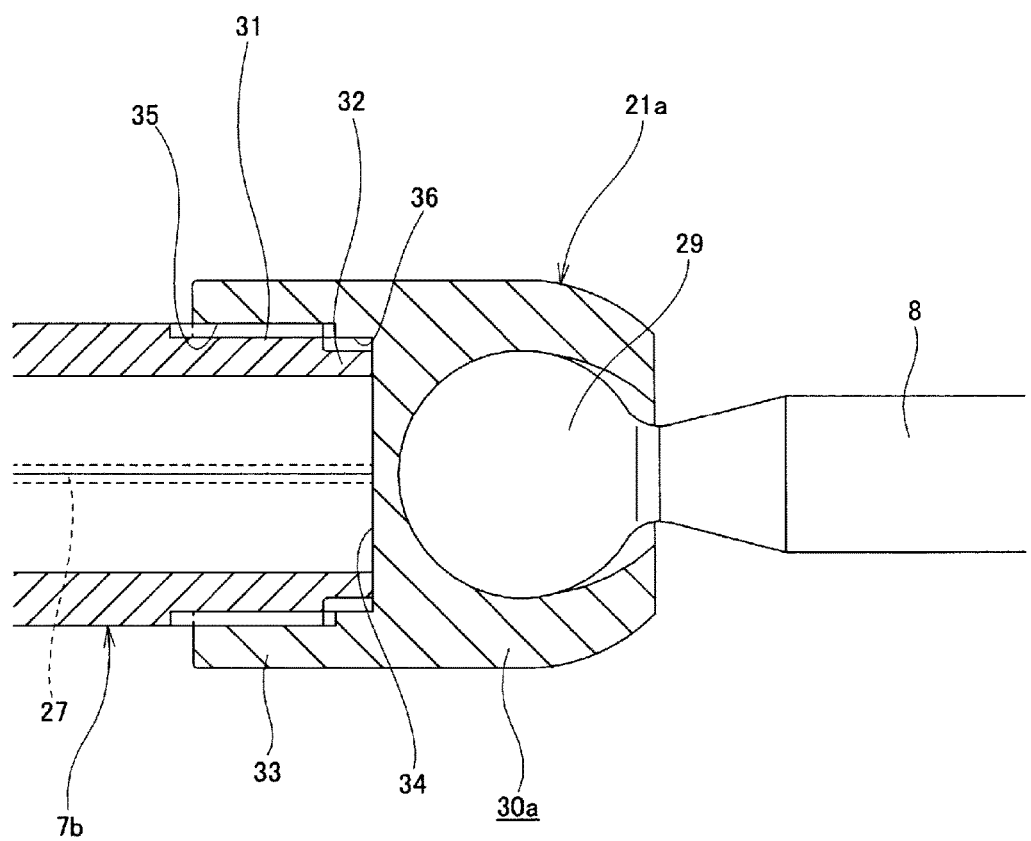
FIG. 2 is an enlarged view of the portion X of FIG. 1.
Figure 3:
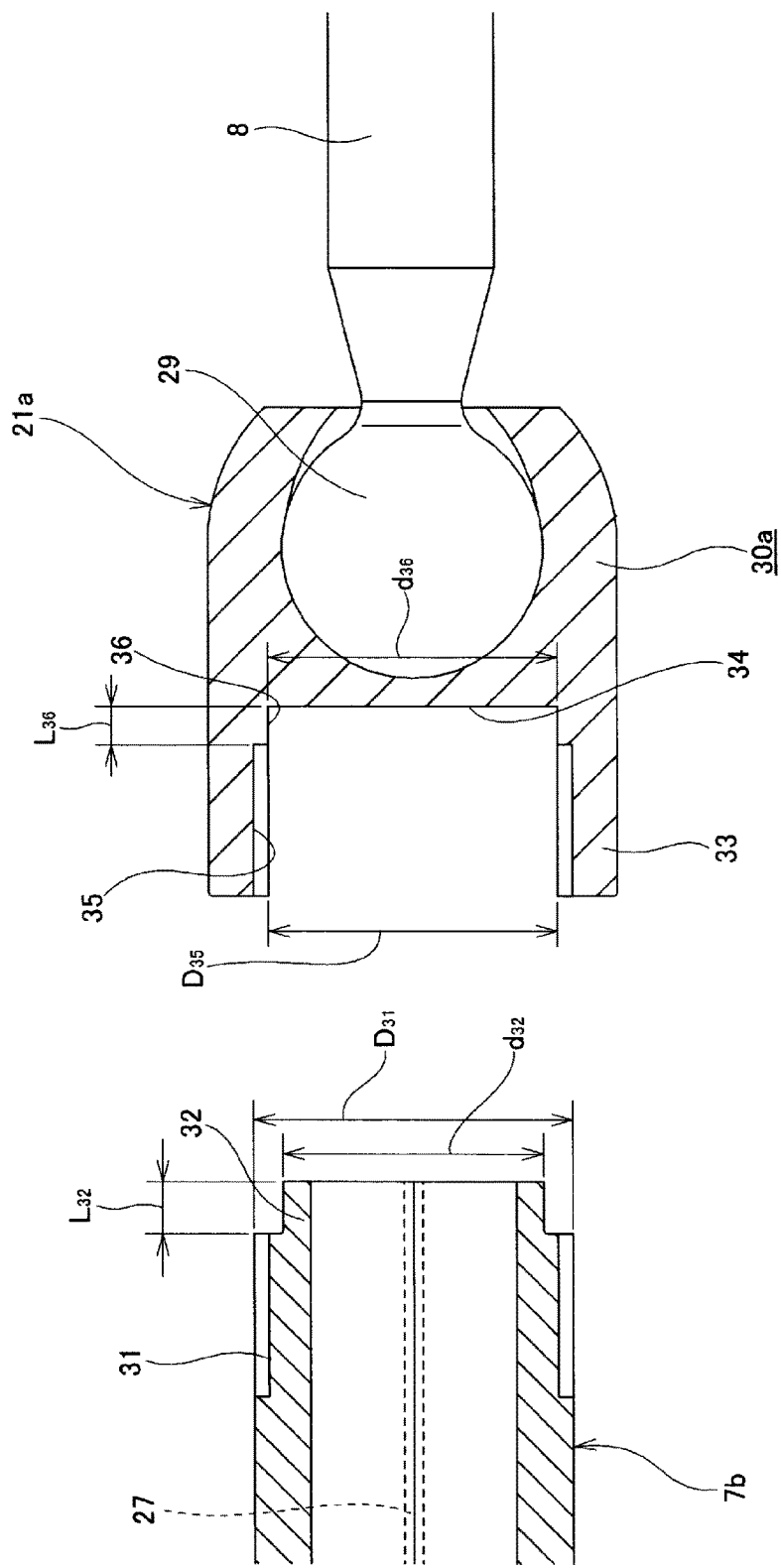
FIG. 3 is an enlarged view illustrating, in a state before coupling, an end portion of a rack shaft and a joint housing of a spherical joint.
Figure 11:
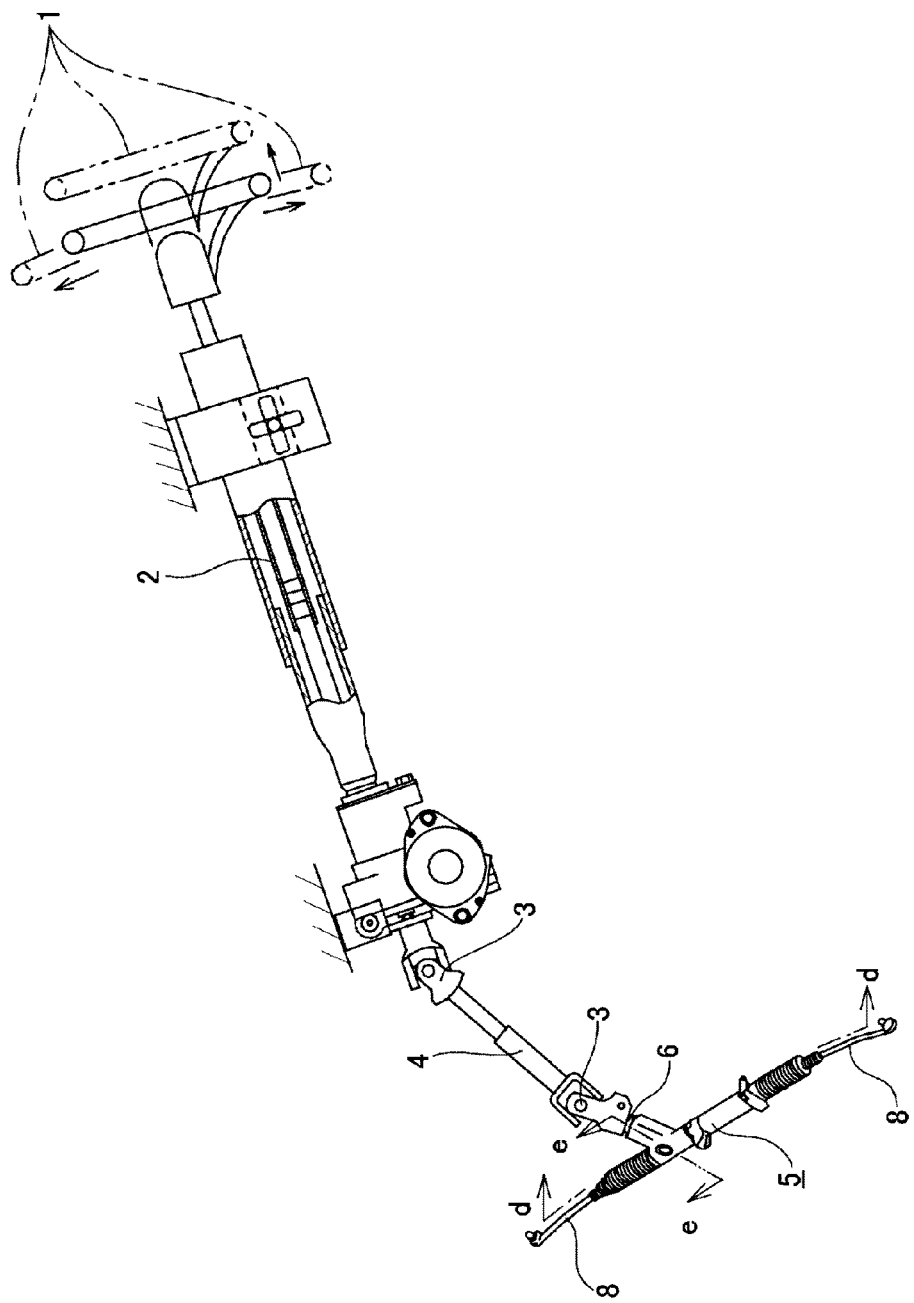
FIG. 11 is a partially cut-away side view illustrating an example of a conventionally known steering apparatus
Figure 12:
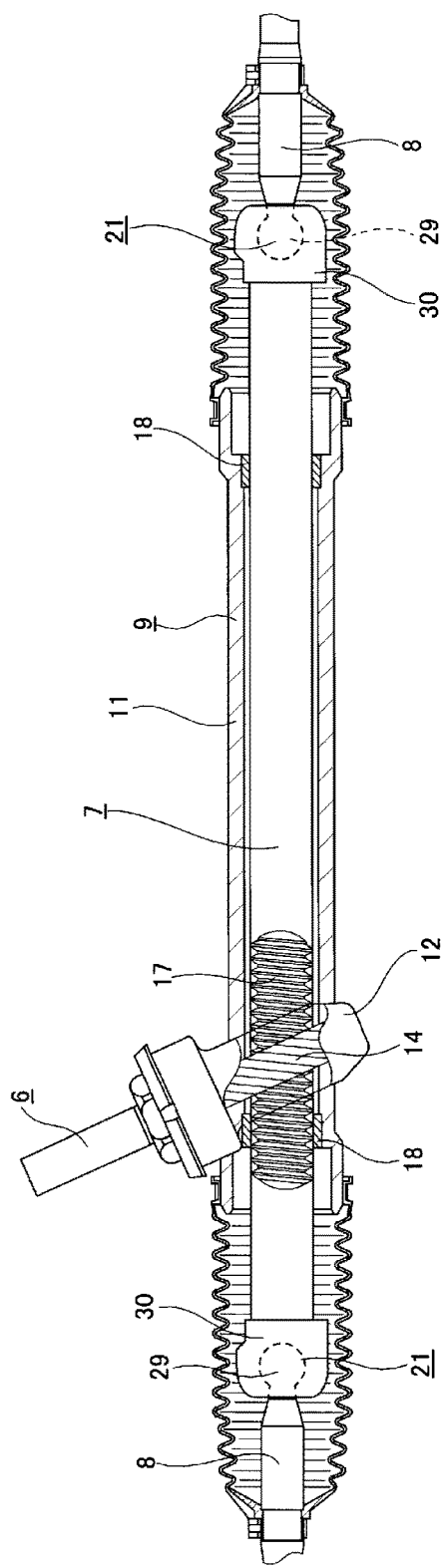
FIG. 12 is an enlarged cross-sectional view taken the line d-d of FIG. 11.
Figure 13:
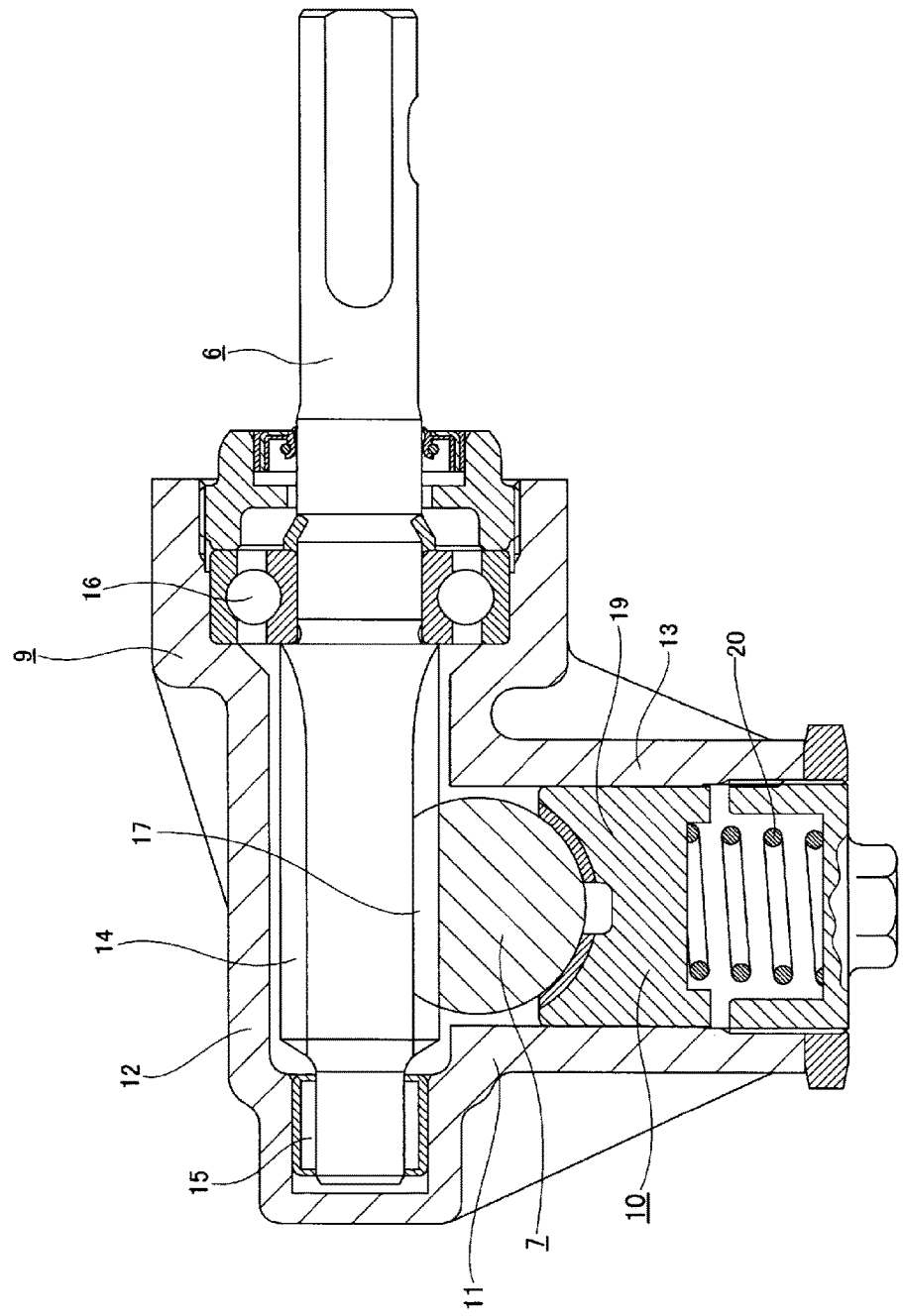
FIG. 13 is an enlarged cross-sectional view taken along the line e-e of FIG. 11.

FIGS. 1 to 3 illustrate a first embodiment according to the present invention. This embodiment is characterized by a structure of a connection between respective end portions of a rack shaft 7b having a hollow pipe shape and joint housings 30a, 30a of a pair of spherical joints 21a, 21a. Since the configurations and operations of other portions are similar to those of the conventional structures shown in FIGS. 11 to 13 described above, such similar portions are designated by the same reference signs, and overlapping illustrations and descriptions are omitted or brief illustrations and descriptions are given, and the features of this embodiment will be mainly described.

Figure 14:
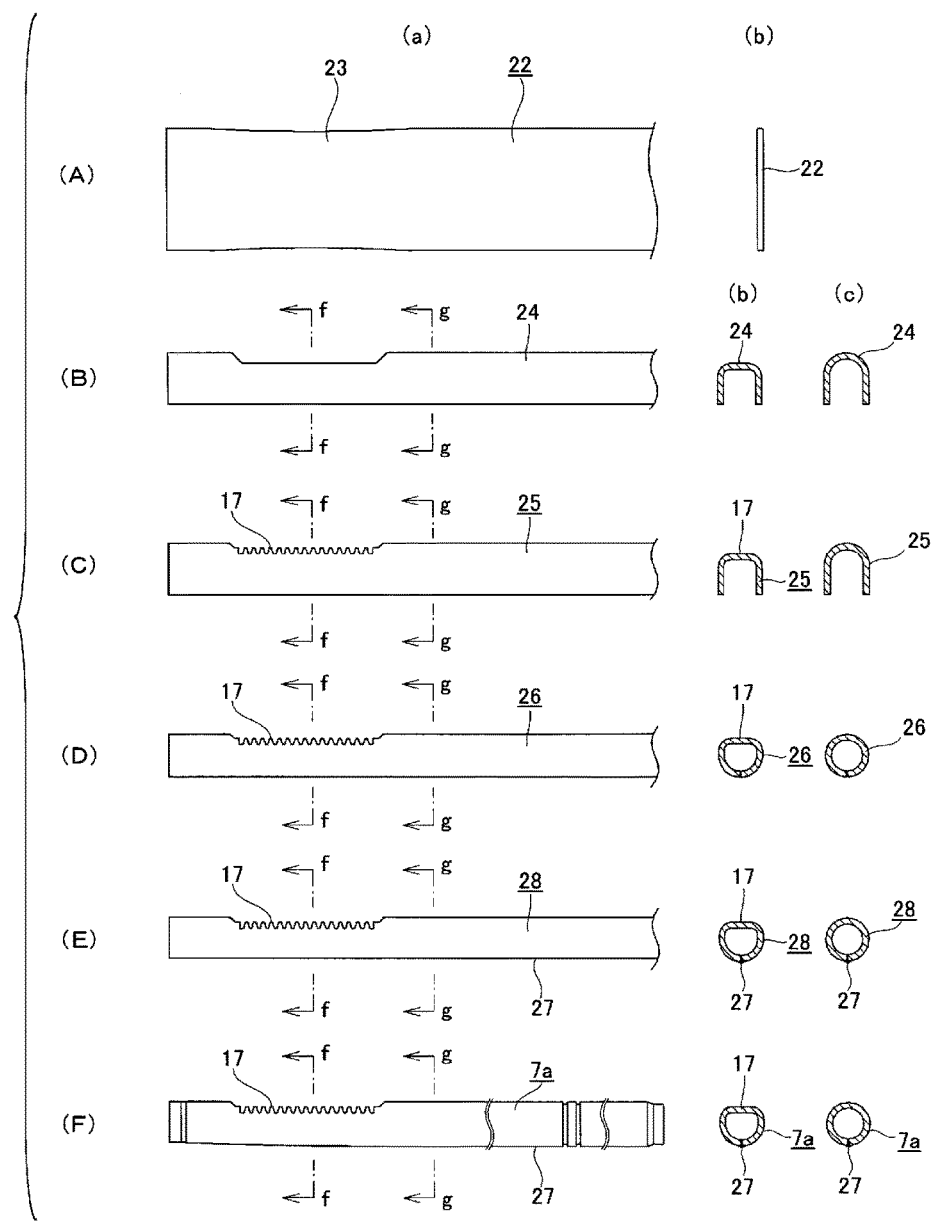
FIG. 14 is a diagram illustrating an example of a method for producing a rack shaft in the order of process, in which (A) illustrates a plan view (a) and an end face view (b) seen from the left of (a), and (B) to (F) illustrate side views (a), cross-sectional views (b) taken along the lines f-f of (a), and cross-sectional views taken along the lines g-g of (a).

A rack-and-pinion steering gear unit according to this embodiment includes a gear housing 9, a pinion shaft 6, a rack shaft 7b, and spherical joints 21a, 21a. The rack shaft 7b is basically made by using a production method similar to the method for producing the conventional rack shaft 7a shown in FIG. 14 described above. In other words, after the fourth intermediate material 28 shown in (E) is obtained in accordance with the order of process (A) to (E) shown in FIG. 14, the final process for giving shapes required for the respective portions of the fourth intermediate material 28 is performed, whereby the whole of the shaft is formed into a hollow pipe shape. Each of the cylindrical end portions of the rack shaft 7b configured as described above has a male screw portion 31 at the portion near the end edge of the outer peripheral surface thereof, and the end edge portion protruding from the male screw portion 31 in the axial direction has a small-diameter protruding portion 32, the outer diameter dimension d32 of which is smaller than the outer diameter dimension D31 of the male screw portion 31 (d32<D31).

Each of the spherical bearings 21a, 21a has a spherical body 29 forming a ball stud provided at the base end portion of the tie rod 8 and the cup-shaped joint housing 30a on the inside of which the spherical body 29 is rotatably held via a resin sheet or the like. Each of the joint housings 30a, 30a is a cast product or forged product made of steel or the like and has a base portion configured as a cylindrical portion 33 having a cylindrical shape. The cylindrical portion 33 is a portion having no joint around the whole circumference, thereby having sufficient strength against the tensile stress and the bending stress in the circumferential direction. The deep end portion in the axial direction on the radially inner side of the cylindrical portion 33 configured as described above is closed with a flat bottom surface 34 that is orthogonal to the center axis of the cylindrical portion 33. The inner peripheral surface of the cylindrical portion 33, excluding the deep end portion in the axial direction, is provided with a female screw portion 35 that can be screwed onto the male screw portion 31. The deep end portion in the axial direction on the inner diameter face of the cylindrical portion 33 is provided with a cylindrical surface portion 36, the inner diameter dimension d36 of which is equal to the inner diameter dimension D35 of the female screw portion 35 (d36=D35).

The outer diameter dimension d32 of the small-diameter protruding portion 32 is smaller than the inner diameter dimension D35 of the female screw portion 35 and the inner diameter dimension d36 of the cylindrical surface portion 36 (d32<D35=d36). The axial dimension L32 of the small-diameter protruding portion 32 is larger than the axial dimension L36 of the cylindrical surface portion 36 (L32>L36).

According to this embodiment, the joint housings 30a, 30a are respectively securely connected to the end portions of the rack shaft 7b as shown in FIG. 2. In other words, the joint housings 30a, 30a are securely connected to the end portions of the rack shaft 7b by screwing the female screw portion 35 onto the male screw portion 31 and by tightening the female screw portion 35 onto the male screw portion 31 in a state in which the distal end (distal end face) of the small-diameter protruding portion 32 abuts on a portion (receiving portion) of the bottom surface 34 near the radially outer side thereof.

According to the rack-and-pinion steering gear unit of this embodiment configured as described above, at the end portion of the rack shaft 7b and the joint housing 30a of the spherical joint 21a being connected to each other, the outer peripheral surface of the end portion of the rack shaft 7b is provided with the male screw portion 31, and the inner peripheral surface of the cylindrical portion 33 provided at the base portion of the joint housing 30s is provided with the female screw portion 35. Hence, when the female screw portion 35 is screwed onto the male screw portion 31 and further tightened to connect the end portion of the rack shaft 7b to the joint housing 30a, the force is exerted to this screw engagement area in a direction in which the diameter of the end portion of the rack shaft 7b reduces. As a result, a compression stress in the circumferential direction, instead of a tensile stress in the circumferential direction, is generated at the end portion of the rack shaft 7b. In other words, in the case of this embodiment, even if the female screw portion 35 is screwed onto the male screw portion 31 and further tightened, no force is exerted in the direction in which the distance between the circumferential end edges of the rack shaft 7b expands. For this reason, it is not necessary to strictly perform strength control for the force for tightening the female screw portion at the end portion (including the welded section 27 at which the circumferential end edges of the rack shaft 7b are connected to each other) of the rack shaft 7b. According to this embodiment, as the female screw portion 35 is tightened, the force is exerted to the screw engagement area in the direction in which the diameter of the cylindrical portion 33 expands, and as a result, a circumferential tensile stress is generated in the cylindrical portion 33. However, since the cylindrical portion 33 has no joint around the whole circumference and has a sufficient strength against the circumferential tensile stress as described above, plastic deformation or the like that may cause problems in function is not caused at the cylindrical portion 33 by the tensile stress. Consequently, according to this embodiment, the connection strength at the connection between the end portion of the rack shaft 7b and the joint housing 30a can be ensured sufficiently at low cost. The quality of this connection can be easily provided.

According to this embodiment, in a state in which the joint housing 30a is connected to the end portion of the rack shaft 7b, the cylindrical portion 33 of the joint housing 30a is fitted on the end portion of the rack shaft 7b. Hence, the strength and rigidity of the connection between the end portion of the rack shaft 7b and the joint housing 30a is easily provided. Therefore, even when large bending load (impact load) is applied to the connection between the end portion of the rack shaft 7b and the joint housing 30a due to the running of a steered wheel over a curbstone for example, plastic deformation or the like at the connection is unlikely to occur. According to this embodiment, the small-diameter protruding portion 32 is elastically compressed in the axial direction while the female screw portion 35 is tightened to the male screw portion 31. Hence, the screw engagement between the female screw portion 35 and the male screw portion 31 is preloaded in the axial direction based on t the elasticity of the small-diameter protruding portion 32, whereby the screw engagement can be prevented from being loosened.

When implementing the structure of the first embodiment described above, the inner diameter dimension d36 of the cylindrical surface portion 36 may be made smaller than the inner diameter dimension D35 of the female screw portion 35 (d36<D35) within a range in which the inner diameter dimension d36 is larger than the outer diameter dimension d32 of the small-diameter protruding portion 32 (d36>e32).

Figure 4:
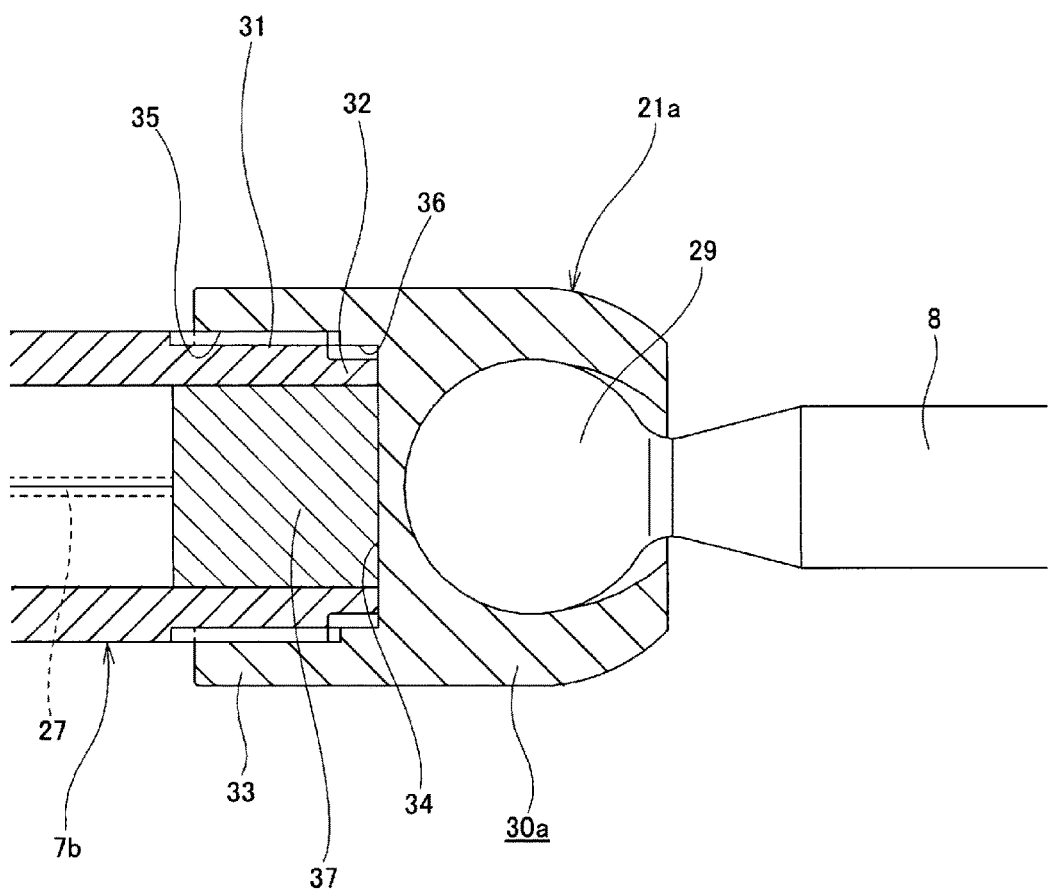
FIG. 4 is partially enlarged view of a rack-and-pinion steering gear unit according to a second embodiment of the present invention.

FIG. 4 illustrates a second embodiment according to the present invention. According to this embodiment, a cylindrical reinforcing member 37 made of metal or synthetic resin is fitted in and held by the end portion of the rack shaft 7b without looseness in the radial direction, for example, by slight press fitting or bonding at their peripheral surfaces opposed to each other. As a result, the strength and rigidity of the end portion of the rack shaft 7b are improved. Furthermore, with this configuration, for example, when large bending load as described above is applied to the connection between the end portion and the joint housing 30a, plastic deformation or the like at the connection is less likely to occur. Since the other configurations and actions are similar to those according to the above-mentioned first embodiment, overlapping illustrations and descriptions are omitted.

The shape of the reinforcing member is not limited to a solid cylindrical shape, but may be other shapes, such as a hollow cylindrical shape.

Figure 5:
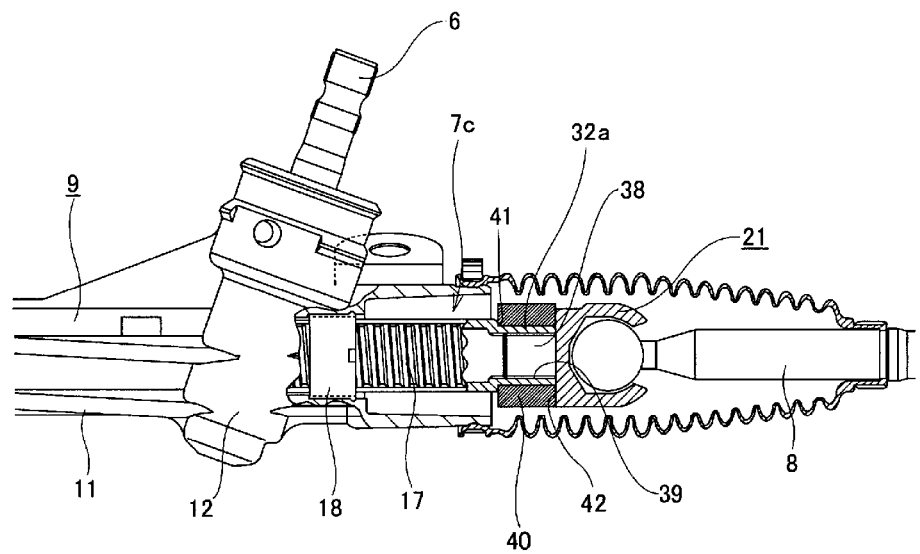
FIG. 5 is a partially cut-away side view of one axial end portion of a rack-and-pinion steering gear unit according to a third embodiment of the present invention.
Figure 6:
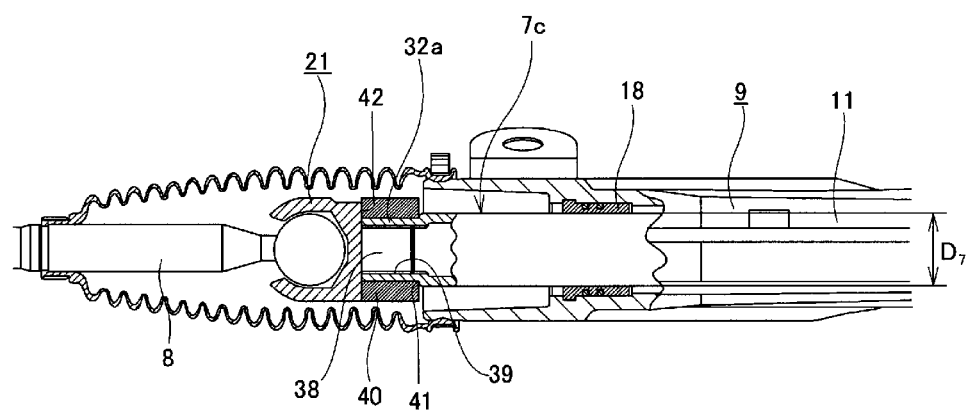
FIG. 6 is a partially cut-away side view of the other axial end portion of the rack-and-pinion steering gear unit according to the third embodiment.

FIGS. 5 and 6 show a third embodiment according to the present invention. This embodiment is characterized by the structure for securing the connection strength of a rack shaft 7c and a spherical joint 21. Since the configurations and actions of the other portions are similar to those of the conventional structures shown in FIGS. 11 to 14 described above, overlapping illustrations and descriptions are omitted or brief illustrations and descriptions are given.

Figure 7:
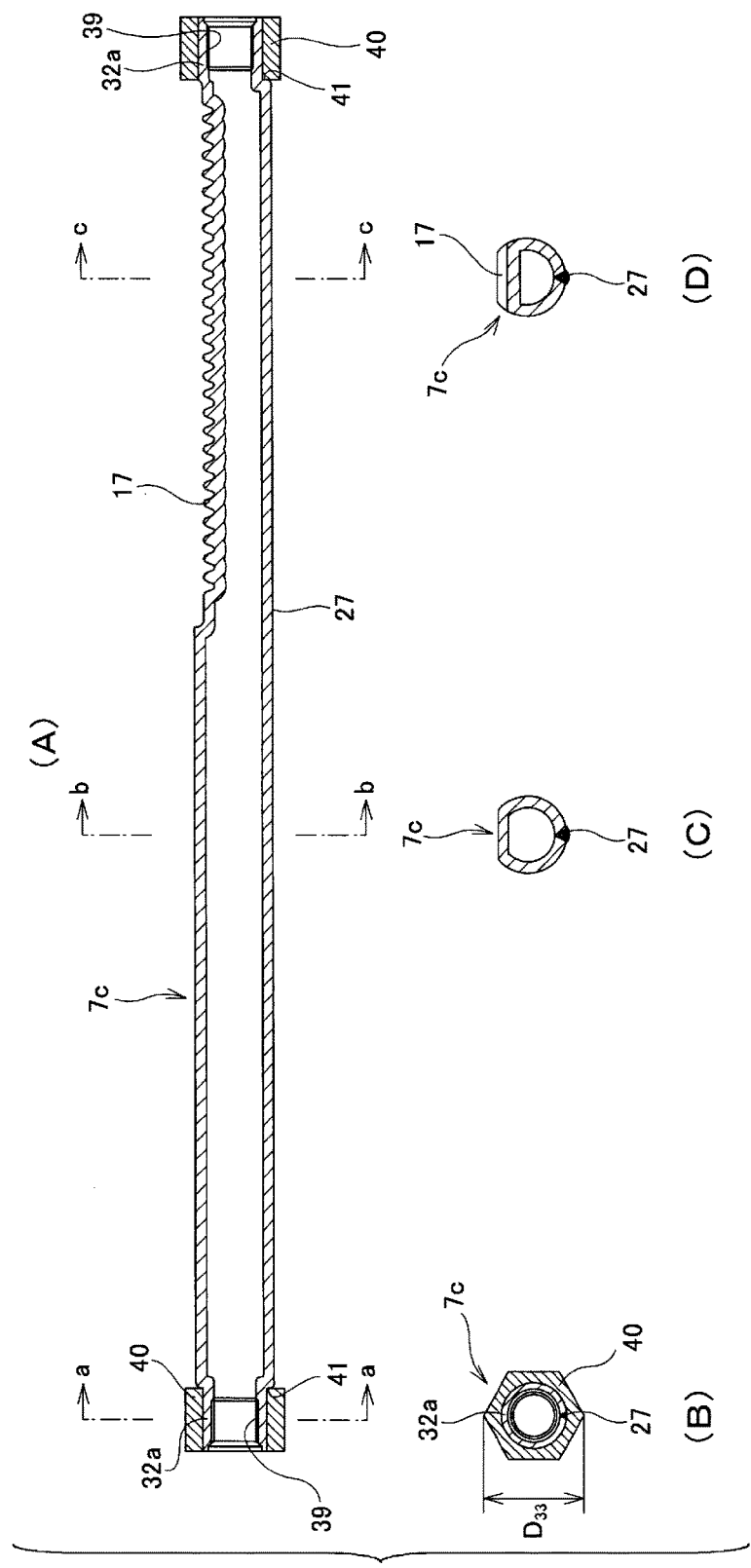
FIG. 7 illustrates a cross-sectional view (A) of a rack shaft according to the third embodiment, a cross-sectional view (B) taken along the line a-a of (A), a cross-sectional view (C) taken along the line b-b of (A), and a cross-sectional view (D) taken along the line c-c of (A).

The rack shaft 7c of the rack-and-pinion steering gear unit according to this embodiment has a hollow pipe shape as a whole, and has rack teeth 17 at a portion near one end in the axial direction and on a front face (the upper face in FIG. 7) thereof. At the axially intermediate portion of the rack shaft 7c, the portion away from the portion in the axial direction in which the rack teeth 17 are provided on the front face is made flat, and the cross-sectional shape of the portion is formed into a lacked circular shape (the front face is linear and the rest is circular). Furthermore, the widthwise end edges of the rack shaft 7c are connected (joined) to each other by the welded section 27 along the entire length in the axial direction. According to this embodiment, the axial end portions of the rack shaft 7c are drawn to provide small-diameter portions 32a, 32a having an outer diameter smaller than that of the portion closer to the axially intermediate portion and having a circular cross-sectional shape. Moreover, screw holes (female screw portions) 39, 39 to be screwed onto the male screw portions 38, 38 provided at the base portions of the spherical joints 21, 21 are provided on the inner peripheral surfaces of the small-diameter portions 32a, 32a. The rack shaft 7c configured as described above is produced using a production method basically similar to that used for the conventional rack shaft 7a described in Patent Document 3 and shown in FIG. 14 described above.

According to this embodiment, sleeves 40, 40 (an example of cylindrical portion) having a hexagonal cylindrical shape and made of a metal, for example, carbon steel, such as S45C, or stainless steel, are press-fitted on the outer peripheral surfaces of the small-diameter portions 32a, 32a of the rack shaft 7c, thereby being securely fitted on by interference fitting. In a state in which the axially inner side faces of the sleeves 40, 40 abut on step portions 41, 41 via which the small-diameter portions 32a, 32a and the portion closer to the axially intermediate portion of the rack shaft 7c are connected to each other, the axial lengths of the sleeves 40, 40 are restricted so that the axial positions of the axially outer faces thereof are almost coincident with the axial positions of the axial end faces of the rack shaft 7c. With this configuration, the axially outer faces of the sleeves 40, 40 and the axial end faces of the rack shaft 7c are positioned to be flush with each other. In a state in which the male screw portions 38, 38 of the spherical joints 21, 21 are screwed into the screw holes 39, 39 of the rack shaft 7c and further tightened, the sleeves 40, 40 are held strongly in the axial direction between the step portions 41, 41 and the seat surfaces 42, 42 (axially inner surfaces) of the spherical joints 21, 21. The cross-sectional shape of the outer peripheral surfaces of the sleeves 40, 40 is not limited to the hexagonal shape shown in the figure, but may be a polygonal shape other than the hexagonal shape or may be a circular shape.

Figure 8:
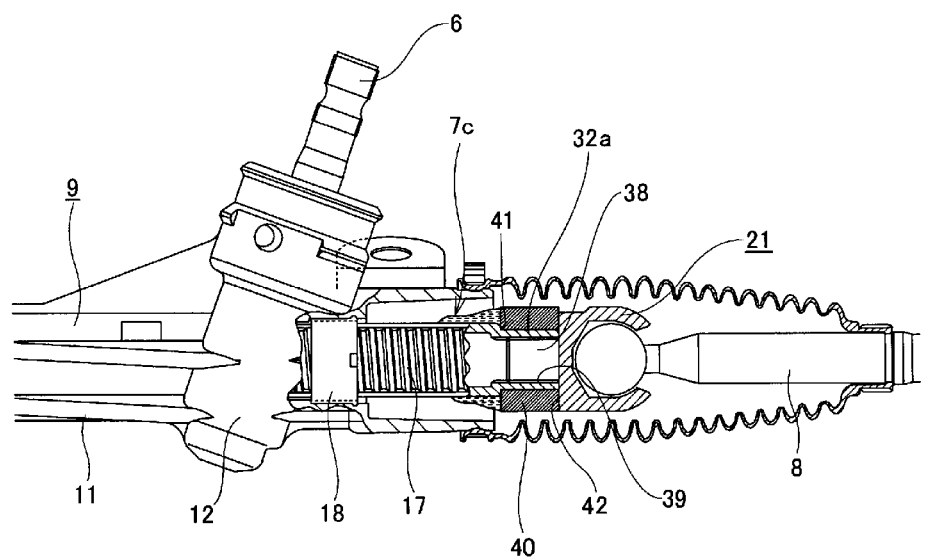
FIG. 8 is a partially enlarged view illustrating a function as a grease reservoir.

According to this embodiment, the diameter D40 of the circumscribed circle of the sleeves 40, 40 is greater than the outer diameter D7 of the portion of the rack shaft 7c closer to the axially intermediate portion of the rack shaft 7c (the portion closer to the axially intermediate portion than the small-diameter portions 32a, 32a). Further, as shown in FIG. 8, the region where (the axially inner surfaces of the sleeves 40, 40 and the outer peripheral surface of the rack shaft 7c are adjacent to each other (the region surrounded by these surfaces) is used as a grease reservoir so that the axial displacement of the rack shaft 7c is smoothly performed.

With the rack-and-pinion steering gear unit according to this embodiment configured as described above, regardless of the impact load applied to the connection between the rack shaft 7c and the spherical joint 21 (the portion where the screw hole 39 and the male screw portion 38 of the spherical joint 21 are engaged), the connection strength of the rack shaft 7c and the spherical joint 21 can be ensured. In other words, since the metal cylindrical sleeves 40, 40 are press-fitted (securely fitted on by interference fitting) to the outer peripheral surfaces of the small-diameter portions 32a, 32a provided at the respective axial end portions of the rack shaft 7c, the rigidity of the axial end portions of the rack shaft 7c in the radial direction can be improved. Hence, even when large load (impact load) is applied to the connection between the rack shaft 7c and the spherical joint 21 due to the running of a steered wheel over a curbstone or the like because of an erroneous driving operation, the small-diameter portion 32a can be prevented from being deformed in a direction in which the inner diameter thereof expands, and stress can be prevented from being concentrated at the welded section 27 in which the widthwise end edges of the rack shaft 7c are connected to each other, whereby the connection strength of the connection can be ensured.

According to this embodiment, it is possible to make the male screw portions 38, 38 of the spherical joints 21, 21 screwed into the screw holes 39, 39 of the rack shaft 7c difficult to be loosened. In other words, since the sleeves 40, 40 are strongly held in the axial direction between the seat surfaces 42, 42 of the spherical joints 21, 21 and the step portions 41, 41 of the rack shaft 7c, the male screw portions 38, 38 can be prevented from being loosened, by the spring action (elastic restoring force for extending in the axial direction) of the sleeves 40, 40. Since not only the axial end faces of the rack shaft 7c but also the axially outer faces of the sleeves 40, 40 abut on the seat surfaces 42, 42, large areas making contact with the seat surfaces 42, 42 can be ensured, whereby the friction force therebetween can be made larger than that in the case that the sleeves 40, 40 are not provided. Further, according to this embodiment, since the portions of the welded section 27 protruding from the axial end faces of the rack shaft 7c bite into the seat surfaces 42, 42 as the male screw portions 38, 38 of the spherical joints 21, 21 are tightened to the screw holes 39, 39, it is possible to make the male screw portions 38, 38 difficult to be loosened.

According to this embodiment, the region where the axially inner surfaces of the sleeves 40, 40 and the outer peripheral surface of the rack shaft 7c are adjacent to each other can be used as a grease reservoir. Hence, lubricant can be supplied continuously for a long time to the sliding sections between the outer peripheral surface of the rack shaft 7c and the inner peripheral surfaces of the rack bushings 18, 18, the rack bushings being used to support the rack shaft 7c in the gear housing 9 so that the rack shaft can be displaced in the axial direction, whereby the durability of the rack-and-pinion steering gear unit can be secured sufficiently.

Figure 9:
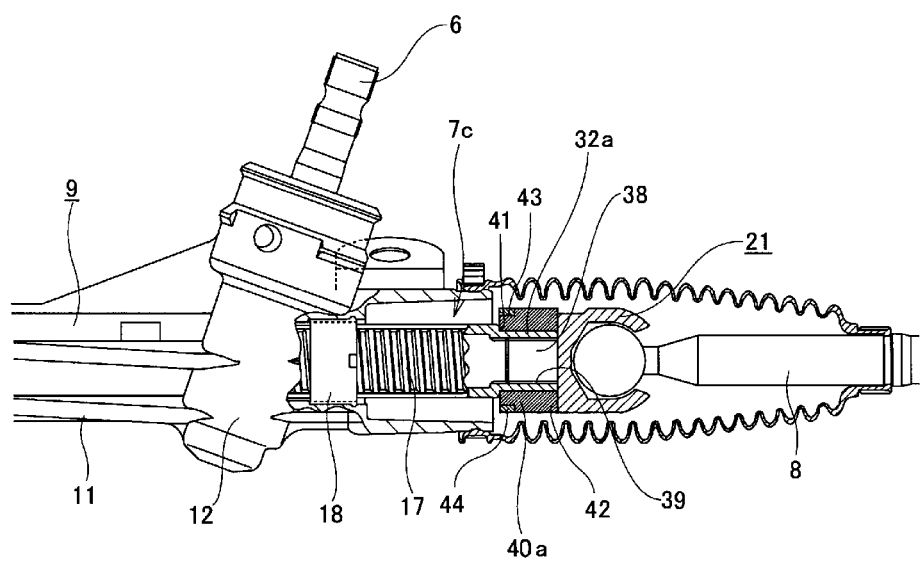
FIG. 9 is a partially cut-away side view of one axial end portion of a rack-and-pinion steering gear unit according to a fourth embodiment of the present invention.

FIG. 9 shows a fourth embodiment according to the present invention. According to this embodiment, an elastic ring 44 made of elastomer, a rubber-like material, and corresponding to the elastic member described in the claims is laid on the small-diameter step portion 43 provided on the outer peripheral edge portion of the axially inner surface of a sleeve 40a in a state of being open to the axially inner surface. Hence, even in the case that the outer peripheral edge portion of the axially inner surface of the sleeve 40a makes contact (collides) with the inner peripheral surface of the gear housing 9 as the rack shaft 7c is displaced in the axial direction, the sleeve 40a and the gear housing 9 can be prevented from colliding with each other energetically. Since the other configurations and actions are similar to those according to the above-mentioned third embodiment, overlapping illustrations and descriptions are omitted.

Figure 10:
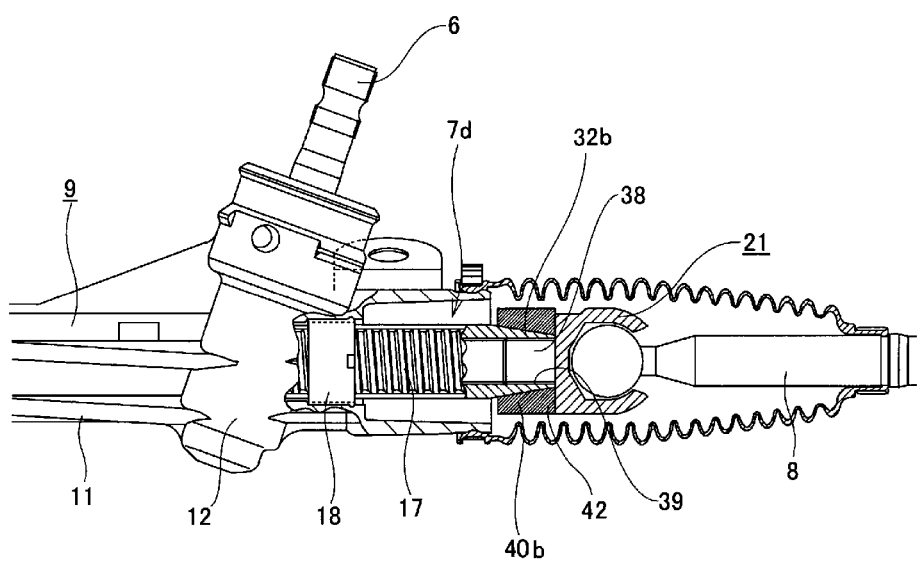
FIG. 10 is a partially cut-away side view of one axial end portion of a rack-and-pinion steering gear unit according to a fifth embodiment of the present invention.

FIG. 10 shows a fifth embodiment according to the present invention. According to this embodiment, the outer peripheral surface of the small-diameter portion 32b provided at the axial end portion of a rack shaft 7d is formed into a partially conical convex face that is inclined in a direction in which the outer diameter is reduced toward the axially outer side (distal end side). Further, the inner peripheral surface of a sleeve 40b is formed into a partially conical concave face that matches the outer peripheral surface of the small-diameter portion 32b. Hence, when the sleeve 40b is pressed inward in the axial direction by the seat surface 42 of the spherical joint 21 as the male screw portion 38 of the spherical joint 21 is screwed into the screw hole 39 provided on the inner peripheral surface of the small-diameter portion 32b, the small-diameter portion 32b is elastically deformed in the direction in which the inner diameter thereof is reduced. As a result, the male screw portion 38 of the spherical joint 21 can be pressed strongly inward in the radial direction by the screw hole 39, whereby the connection strength of the rack shaft 7d and the spherical joint 21 can be improved. Since the other configurations and actions are similar to those according to the above-mentioned third embodiment, overlapping illustrations and descriptions are omitted.

INDUSTRIAL APPLICABILITY

In implementing the present invention, the circumferential end edges of the rack shaft may not necessarily be joined to each other by the welded section. For example, the welded section 27 may be omitted in the structures of the first and second embodiments described above. The reinforcing member of the second embodiment may be integrally provided with the joint housing of the spherical joint.

Also in the third to fifth embodiments, the widthwise end edges of the rack shaft may not necessarily be securely joined to each other by the welded section. That is, there may be a structure in which, in a state in which a metal plate is bent and the widthwise end edges thereof are butted to each other, metal cylindrical sleeves are press-fitted on the axial end portions, without welding the widthwise end edges to each other. The connection between the rack shaft and the spherical joint is not limited to the structures of the third to fifth embodiments. That is, there may be a structure in which the support hole provided on the inner peripheral surface of the axial end portion of the rack shaft is formed as a simple cylindrical face, and the shaft portion provided at the base portion of the spherical joint is securely fitted in the support hole by interference fitting.

The present application is based on Japanese Patent Application No. 2013-123433 filed on Jun. 12, 2013 and Japanese Patent Application No. 2013-124930 filed on Jun. 13, 2013, and the contents of which are incorporated herein by reference.

DESCRIPTION OF REFERENCE SIGNS 1 steering wheel
2 steering shaft
3 universal joint
4 intermediate shaft
5 steering gear unit
6 pinion shaft
7, 7a, 7b, 7c, 7d rack shaft
8 tie rod
9 gear housing
10 pressing means
11 first housing
12 second housing
13 third housing
14 pinion teeth
15 rolling bearing
16 rolling bearing
17 rack teeth
18 rack bushing
19 pressing member
20 spring
21, 21a spherical joint
22 blank plate
23 narrow portion
24 first intermediate material
25 second intermediate material 26 third intermediate material
27 welded section
28 fourth intermediate material
29 spherical body
30, 30a joint housing
31 male screw portion
32 small-diameter protruding portion
33 cylindrical portion
34 bottom surface
35 female screw portion
36 cylindrical surface portion
37 reinforcing member
32a, 32b small-diameter portion
38 male screw portion
39 screw hole
40, 40a, 40b sleeve
41 step portion
42 seat surface
43 small-diameter step portion
44 elastic ring

The invention claimed is:

1. A rack-and-pinion steering gear unit comprising a gear housing, a pinion shaft, a rack shaft, and cylindrical portions,
wherein the pinion shaft comprises pinion teeth on an outer peripheral surface of an axially intermediate portion of the pinion shaft and is rotatably supported inside the gear housing,
wherein the rack shaft is configured as a hollow pipe as a whole by bending an elongated metal plate such that widthwise end edges of the metal plate are butted to each other, the rack shaft comprising rack teeth on a front face of the rack shaft partially in an axial direction, the rack shaft being disposed in a skew manner with respect to the pinion shaft and supported inside the gear housing so as to be displaceable in the axial direction in a state in which the rack teeth are engaged with the pinion teeth, and
wherein each cylindrical portion is fitted on each end portion of the rack shaft, further comprising a pair of spherical joints to connect the respective end portions of the rack shaft to a pair of tie rods, the pair of tie rods having distal end portions to which left and right wheels to be steered are connected and base end portions to which the pair of spherical joints is connected,
wherein each of the spherical joints comprises a joint housing connected to the end portion of the rack shaft,
wherein an outer peripheral surface of the end portion of the rack shaft comprises a male screw portion,
wherein the joint housing has a base portion configured as the cylindrical portion, an inner peripheral surface of the cylindrical portion comprising a female screw portion, and
wherein the joint housing is connected to the end portion of the rack shaft in a state in which the female screw portion is screwed onto the male screw portion.

2. The rack-and-pinion steering gear unit according to claim 1, further comprising a reinforcing member fitted in and held by the end portion of the rack shaft.

3. The rack-and-pinion steering gear unit according to claim 1, wherein the end portion of the rack shaft further comprises a small-diameter protruding portion protruding from the male screw portion in the axial direction, and an outer diameter of the small-diameter protruding portion is smaller than an inner diameter of the female screw portion,
wherein the joint housing comprises, at an axially recessed portion in a radially inner side of the cylindrical portion, a receiving portion on which a distal end of the small-diameter protruding portion is allowed to abut, and
wherein the joint housing is connected to the end portion of the rack shaft in a state in which the distal end of the small-diameter protruding portion abuts the receiving portion.

4. A rack-and-pinion steering gear unit comprising a gear housing, a pinion shaft, a rack shaft, and cylindrical portions,
wherein the pinion shaft comprises pinion teeth on an outer peripheral surface of an axially intermediate portion of the pinion shaft and is rotatably supported inside the gear housing,
wherein the rack shaft is configured as a hollow pipe as a whole by bending an elongated metal plate such that widthwise end edges of the metal plate are butted to each other, the rack shaft comprising rack teeth on a front face of the rack shaft partially in an axial direction, the rack shaft being disposed in a skew manner with respect to the pinion shaft and supported inside the gear housing so as to be displaceable in the axial direction in a state in which the rack teeth are engaged with the pinion teeth, and
wherein each cylindrical portion is fitted on each end portion of the rack shaft,
wherein the end portion of the rack shaft comprises an inner peripheral surface forming a support hole in which a spherical joint is securely supported, the spherical joint supporting a base end portion of a tie rod connected to a wheel to be steered in a turnable manner, and
wherein each cylindrical portion is configured as a metal sleeve press-fitted on an outer peripheral surface of the end portion of the rack shaft.

5. The rack-and-pinion steering gear unit according to claim 4, wherein the spherical joint has a base portion on which a male screw portion is provided, and
the support hole is configured as a screw hole in which the male screw portion is screwed.

6. The rack-and-pinion steering gear unit according to claim 5, wherein an axially outer face of the sleeve and an axial end face of the rack shaft are arranged to be flush with each other.

7. The rack-and-pinion steering gear unit according to claim 5, wherein the end portion of the rack shaft is configured as a small-diameter portion having a smaller outer diameter smaller than of a portion closer to an axially intermediate portion of the rack shaft,
wherein the rack shaft comprises a step portion connecting the portion closer to the axially intermediate portion and the small-diameter portion to each other, and
wherein the sleeve is held between the step portion and a seat surface of the spherical joint in the axial direction.

8. The rack-and-pinion steering gear unit according to claim 4, further comprising an elastic member provided on at least an outer peripheral edge portion of the axially inner surface of the sleeve and along an entire circumference of the outer peripheral edge portion.

9. The rack-and-pinion steering gear unit according to claim 4, wherein the outer peripheral surface of the end portion of the rack shaft is configured as a partially conical convex face that is inclined in a direction in which an outer diameter is reduced toward the distal end of the end portion, and an inner peripheral surface of the sleeve is configured as a partially conical concave face that matches the partially conical convex face.

\* \* \* \* \*